US008463565B1

(12) United States Patent
Osterhout et al.

(10) Patent No.: US 8,463,565 B1
(45) Date of Patent: *Jun. 11, 2013

(54) LED FLASHLIGHT WITH BATTERY LIFE INDICATOR

(75) Inventors: Ralph Osterhout, San Francisco, CA (US); Michael J. Keating, Hardwick, NJ (US); Antony Van der Mude, Hacketstown, NJ (US)

(73) Assignee: Osterhout Design Group, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/336,796

(22) Filed: Dec. 23, 2011

Related U.S. Application Data (63) Continuation of application No. 12/467,828, filed on May 18, 2009, now Pat. No. 8,104,915.

(51) Int. Cl.
*G01R 31/36* (2006.01)

(52) U.S. Cl.
USPC ............. 702/63; 320/118; 320/131; 320/149; 320/150

(58) Field of Classification Search
USPC ................ 702/63; 320/118, 131, 149, 150
See application file for complete search history.

(56) References Cited

U.S. PATENT DOCUMENTS

| 4,876,632 | A | 10/1989 | Osterhout et al. | |
| 4,962,347 | A | 10/1990 | Burroughs et al. | |
| 5,684,404 | A | 11/1997 | Millar | |
| 6,471,367 | B2 | 10/2002 | Garofalo | |
| 6,583,606 | B2 * | 6/2003 | Koike et al. | 320/149 |
| 6,616,296 | B1 | 9/2003 | Roux et al. | |
| 7,295,129 | B2 | 11/2007 | Eisenson | |
| 8,104,915 | B1 | 1/2012 | Osterhout et al. | |
| 2003/0222867 | A1 * | 12/2003 | Bean et al. | 345/211 |
| 2006/0164039 | A1 * | 7/2006 | Ukon | 320/132 |

* cited by examiner

*Primary Examiner* — Sujoy Kundu
*Assistant Examiner* — Haidong Zhang
(74) *Attorney, Agent, or Firm* — Kilpatrick Townsend & Stockton LLP

(57) ABSTRACT

A flashlight includes a light powered by a battery, and a circuit having: a memory for storing a battery life information and voltage output information versus time for the battery to power the light, a controller operating a count down timer to accumulate an amount of time that the battery powers the light, a voltage measure circuit for monitoring the voltage output by the battery while the battery powers the light and supply the voltage output to the controller. The controller determines: a first remaining battery life by comparing the accumulated time to the battery life, a second remaining battery life by comparing the voltage output to the voltage output information, and the lesser of the first and second remaining battery lives. The flashlight includes a display for receiving a command from the controller to display the lesser of the first remaining battery life and the second remaining battery life.

11 Claims, 4 Drawing Sheets

(Part A)

(Part B)

FIG. 1A    FIG. 1B

FIG. 2
(Part A)

FIG. 2
(Part B)

FIG. 3

| | Alkaline 1st Manufacturer | Heavy Duty Alkaline 1st Manufacturer | Lithium Ion 1st Manufacturer | Alkaline 2nd Manufacturer |
|---|---|---|---|---|
| Light in Low Light State | 7.5 hours | 6 hours | 18 hours | 17 hours |
| Light in Intermediate State | 5.5 hours | 5 hours | 15 hours | 14 hours |
| Light in Bright Light State | 4 hours | 3.5 hours | 13 hours | 12 hours |
| Light in Flashing Light State | 4 hours | 3.5 hours | 13 hours | 12 hours |

FIG. 4

LED FLASHLIGHT WITH BATTERY LIFE INDICATOR

CROSS REFERENCE TO RELATED APPLICATION DATA

The present application is a Continuation of U.S. Ser. No. 12/467,828 filed May 18, 2009 (Allowed); the full disclosure of which is incorporated herein by reference in its entirety for all purposes.

BACKGROUND OF THE INVENTION

The present invention generally relates to a portable device that includes a battery life indicator. More particularly, the present invention relates to a portable device, such as a flashlight, having a battery life indicator, which is configured to display the remaining battery life of the non-rechargeable batteries or rechargeable batteries powering the portable device.

Portable devices, such as flashlights, are often powered by non-rechargeable batteries. It is desirable to determine the battery life remaining in the non-rechargeable batteries and display this information on the portable device. Numerous types of non-rechargeable batteries and rechargeable batteries are available for use in a portable device and these numerous types of batteries often have different life times and different power discharge profiles for these life times. Similarly, these numerous non-rechargeable batteries and rechargeable batteries have different life times and different power discharge profiles for portable devices of varying load currents. As the different types of non-rechargeable batteries and rechargeable batteries often have different life times and power discharge profiles, providing relatively accurate information for remaining battery life in a non-rechargeable batteries and rechargeable batteries continues to be challenge. Furthermore, the assurance that most or all of the available energy has been consumed from batteries prior to disposal or recycling is of growing importance in today's "Green" marketplaces.

A number of portable devices, such as flashlights, have been developed that include battery life indicators. Each of the following listed U.S. patents describe portable devices having battery life indicators: U.S. Pat. Nos. 4,876,632, 4,962,347, 5,684,404, and 7,295,129. While a number of a battery life indicators for flashlight exist, an impetus remains to provide users with flash lights and other portable devices with battery life indicators that provide improved accuracy.

BRIEF SUMMARY OF THE INVENTION

The present invention generally provides a portable device that includes a battery life indicator. More particularly, the present invention provides to a portable device, such as a flashlight, having a battery life indicator, which is configured to display the remaining battery life of the non-rechargeable batteries powering the portable device.

One specific embodiment of the flashlight includes a light generation element configured to be powered by a battery. The flashlight further includes a circuit coupled to the light generation element where the circuit includes: i) a memory configured to store battery life information for the battery, wherein the battery life information includes a battery life of the battery and includes voltage output information of the battery over a time of use of the battery to power the light generation element, ii) a controller configured to operate as a count down timer to accumulate an amount of time that the battery provides power to the light generation element to light the light generation element, and iii) a voltage measure circuit configured to monitor the voltage output by the battery while the battery provides power to the light generation element to light the light generation element and supply voltage information for the voltage output to the controller. The controller is configured to: i) determine a first remaining battery life for the battery via comparison of the accumulated time to the battery life, ii) determine a second remaining battery life via comparison of the supplied voltage information from the voltage measure circuit to the voltage output information of the battery over time and while under various discharge load conditions, and iii) determine the lesser of the first remaining battery life and the second remaining battery life. The flashlight further includes a display coupled to the controller and configured to receive a command from the controller to display the lesser of the first remaining battery life and the second remaining battery life.

According to a specific embodiment of the flashlight, the display is configured to display the lesser of the first remaining battery life and the second remaining battery life in an hours and minutes format. The display is also configured to display a plurality of colors and the colors indicate different percentages of remaining battery life of the battery. The plurality of colors may include green, yellow, orange, and red.

According to a specific embodiment of the flashlight, the flashlight further includes a battery compartment configured to house the battery; and a temperature sensor disposed in a battery compartment and coupled to the controller. The temperature sensor is configured to detect the temperature of the battery, and the controller is configured to receive temperature information from the temperature sensor and adjust the first remaining battery life based on the temperature information.

According to a specific embodiment of the flashlight, the controller is configured to decrease the first remaining battery life to the second remaining battery life if the second remaining battery life is less than the first remaining battery life. The control is also configured not to increase the first remaining battery life if the second remaining battery life is greater than the first remaining battery life.

According to a specific embodiment of the flashlight, the flashlight further includes an on/off device coupled to the controller and configured to be activated to turn on the light generation element to a plurality of light states may include a first, a second, and a third light state. The light generation element in the first light state is configured to output less light than the light generation element in the second light state, and the light generation element is configured to output less light in the second light state than in the third light state. The plurality of light states may also include a fourth state for a strobe.

According to a specific embodiment of the flashlight, the battery has a first battery life in the first light state, a second battery life in the second light state, and a third battery life in the third light state. The first battery life is longer than the second battery life, and the second battery life is longer than the third battery life. The battery life information includes the first battery life, the second battery life, and the third battery life. The controller is configured to determine the first remaining battery life based on the light states of the light generation element, the first battery life, the second battery life, and the third battery life. The battery has i) a first voltage output versus time in the first light state, ii) a second voltage output versus time in the second light state, and iii) a third voltage output versus time in the third light state. The controller is configured to determine the second remaining battery life based on the light states of the light generation element, the first voltage output versus time, the second voltage output versus time, and the third voltage output versus time.

According to a specific embodiment of the flashlight, the flashlight further includes a closed loop control circuit configured to provide a substantially constant delivery of average current through the light emitting device via closed loop control, wherein the closed loop control circuit is configured to compare a predetermined set point for current for a plurality of battery life discharge profiles versus measured variable current scaled and delivered to the microcontroller via the closed loop control circuit.

According to another embodiment of the present invention, a circuit is configured for use in a portable electronic device, which is configured to be powered by a battery. The circuit includes a memory configured to store battery life information for the battery, wherein the battery life information includes a battery life of the battery and includes voltage output profile information of the battery over a time of use of the battery to power the portable electronic device. The circuit further includes a controller coupled to the memory and configured to receive the battery life information from the memory and to operate as a count down timer to accumulate an amount of time that the battery provides power to the light generation element to light the light generation element. The circuit further includes a voltage measure circuit coupled to the controller and configured to monitor the voltage output by the battery while the battery provides power to the portable electronic device to power the portable electronic device and to supply voltage information for the voltage output to the controller. The controller is configured to i) determine a first remaining battery life for the battery via comparison of the accumulated time to the battery life, ii) determine a second remaining battery life via comparison of the supplied voltage information from the voltage measure circuit to the voltage output information of the battery over time, and iii) determine the lesser of the first remaining battery life and the second remaining battery life. The circuit further includes a display coupled to the controller and is configured to receive a command from the controller to display the lesser of the first remaining battery life and the second remaining battery life.

According to a specific embodiment, the display is configured to display the lesser of the first remaining battery life and the second remaining battery life in an hours and minutes format. The display is configured to display a plurality of colors and the colors indicate different percentages of remaining battery life of the battery. The plurality of colors may include green, yellow, orange, and red.

According to another specific embodiment, the circuit further includes a temperature sensor disposed adjacent to the battery and coupled to the controller, wherein the temperature sensor is configured to detect the temperature of the battery, and the controller is configured to receive temperature information from the temperature sensor and adjust the first remaining battery life based on the temperature information. The controller is configured to decrease the first remaining battery life to the second remaining battery life if the second remaining battery life is less than the first remaining battery life.

According to one embodiment of the present invention, a portable electronic device is configured to be powered by a battery and includes a memory configured to store battery life information for the battery. The battery life information includes a battery life profile of the battery and includes voltage output information of the battery over a time of use of the battery to light the light generation element. The portable electronic device further includes a controller coupled to the memory and is configured to receive the battery life information from the memory. The controller is further configured to operate as a count down timer to accumulate an amount of time that the battery provides power to power the portable electronic device. The portable device further includes a voltage measure circuit configured to monitor the voltage output by the battery while the battery provides power to power the portable electronic device and to supply voltage information for the voltage to the controller. The controller further is configured to i) determine a first remaining battery life for the battery via comparison of the accumulated time to the battery life, ii) determine a second remaining battery life via comparison of the supplied voltage information from the voltage measure circuit to the voltage output information of the battery over time, and iii) determine the lesser of the first remaining battery life and the second remaining battery life. The portable electronic device further includes a display coupled to the controller and configured to receive a command from the controller to display the lesser of the first remaining battery life and the second remaining battery life.

A better understanding of the nature and advantages of the present invention may be gained with reference to the following detailed description and the accompanying drawings.

DETAILED DESCRIPTION OF SELECT EMBODIMENTS

The present invention generally provides a portable device that includes a battery life indicator. More particularly, the present invention provides a portable device, such as a flashlight, having a battery life indicator, which is configured to display the remaining battery life of the non-rechargeable batteries powering the portable device.

Figure 1A:
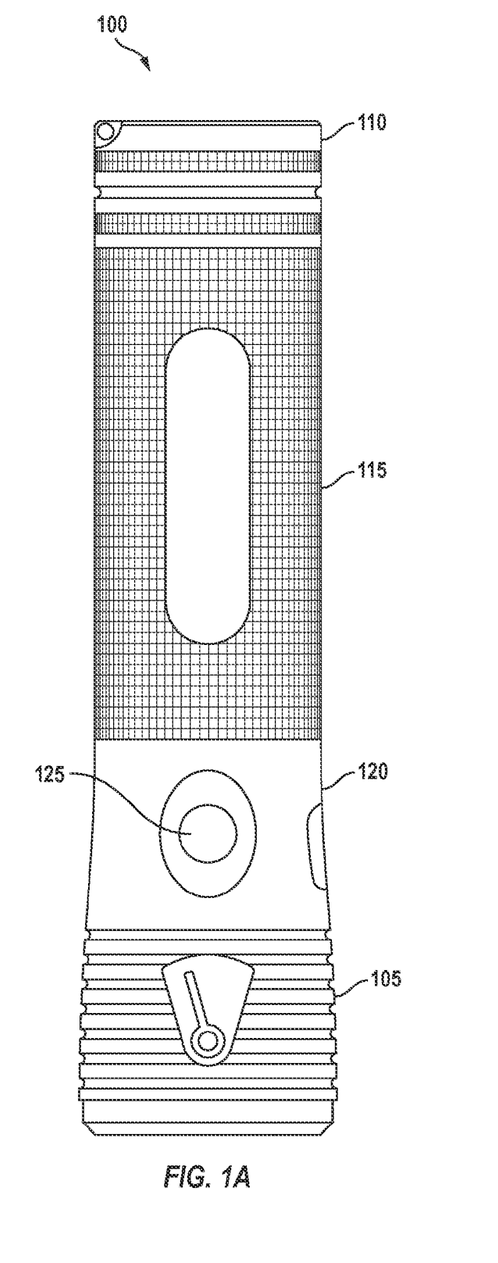
FIGS. 1A and 1B are simplified side views of a flash light according to one embodiment of the present invention.
Figure 1B:
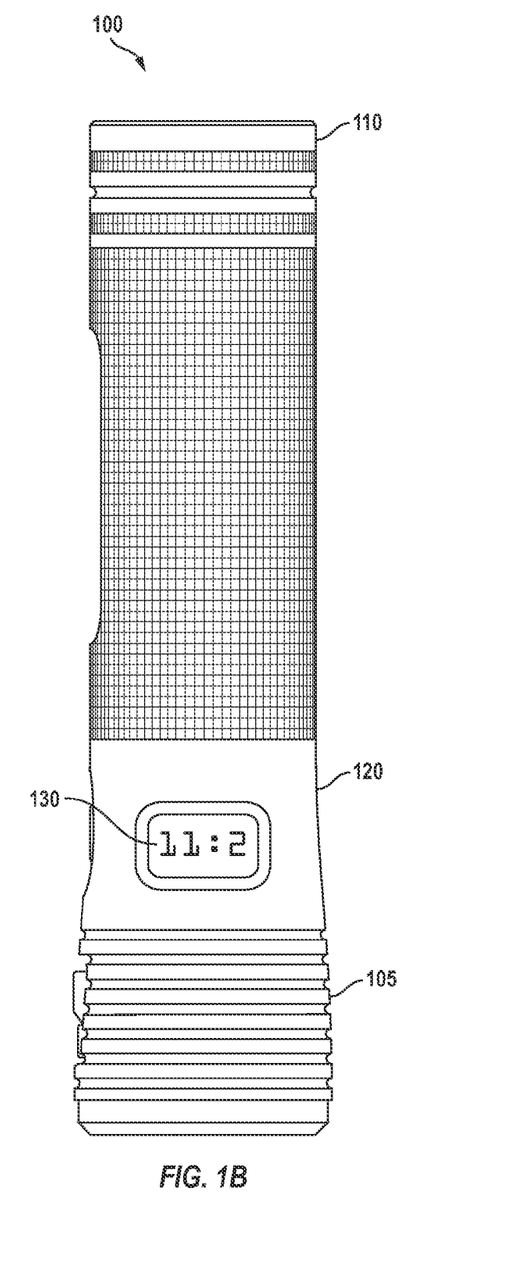

FIGS. 1A and 1B are simplified side views of a flash light 100 according to one embodiment of the present invention. Flash light 100 includes a front cap 105, a back cap 110, a battery compartment 115, and a switch case 120. Front cap 105 is configured to house a light generation element 210 (shown in FIG. 2). The light generation element may include a set of light emitting diodes (LEDs), a set of incandescent light bulbs, or the like. A set as referred to herein includes one or more elements. Battery compartment 115 is configured to house a set of batteries, which may be non-rechargeable batteries or rechargeable batteries. Back cap 110 may be configured to be removable coupled to the battery compartment to that the set of batteries may be placed into and removed from the flashlight.

Switch case 120 includes an on/off button 125, which is configured to turn on and off the flash light's light generation element. The switch case may also include a display 130, which may be an liquid crystal display (LCD) or other relatively low-power consumption display. According to one embodiment, the display is configured to display the remaining battery life of the set of batteries in the battery compartment. Remaining battery life as referred to herein includes the time remaining before a battery no longer produces sufficient voltage or current to perform a desired function, such as powering a light emitting device in a flashlight.

According to one embodiment of the present invention, the display is configured to display the hours and minutes of battery life remaining in a set of batteries. According to another embodiment of the present invention, the display may also be configured to display various colors to indicate the amount of battery life remaining in the batteries. The display may be green, for example, if, the batteries have more than 80% of battery life remaining. The display may be yellow, for example, if the batteries have 20%-80% of their battery life remaining. The display may be orange, for example, if the batteries have 10%-20% of their battery life remaining. The display may be red, for example, if the batteries have 0%-10% of their battery life remaining. The display may flash red, for example, if the batteries have 0%-1% of their battery life remaining. The display may include a back light configured to light the display the various colors. According to one embodiment, the back light may be turned off if the remaining battery life drops below 5% for example.

Figure 2:
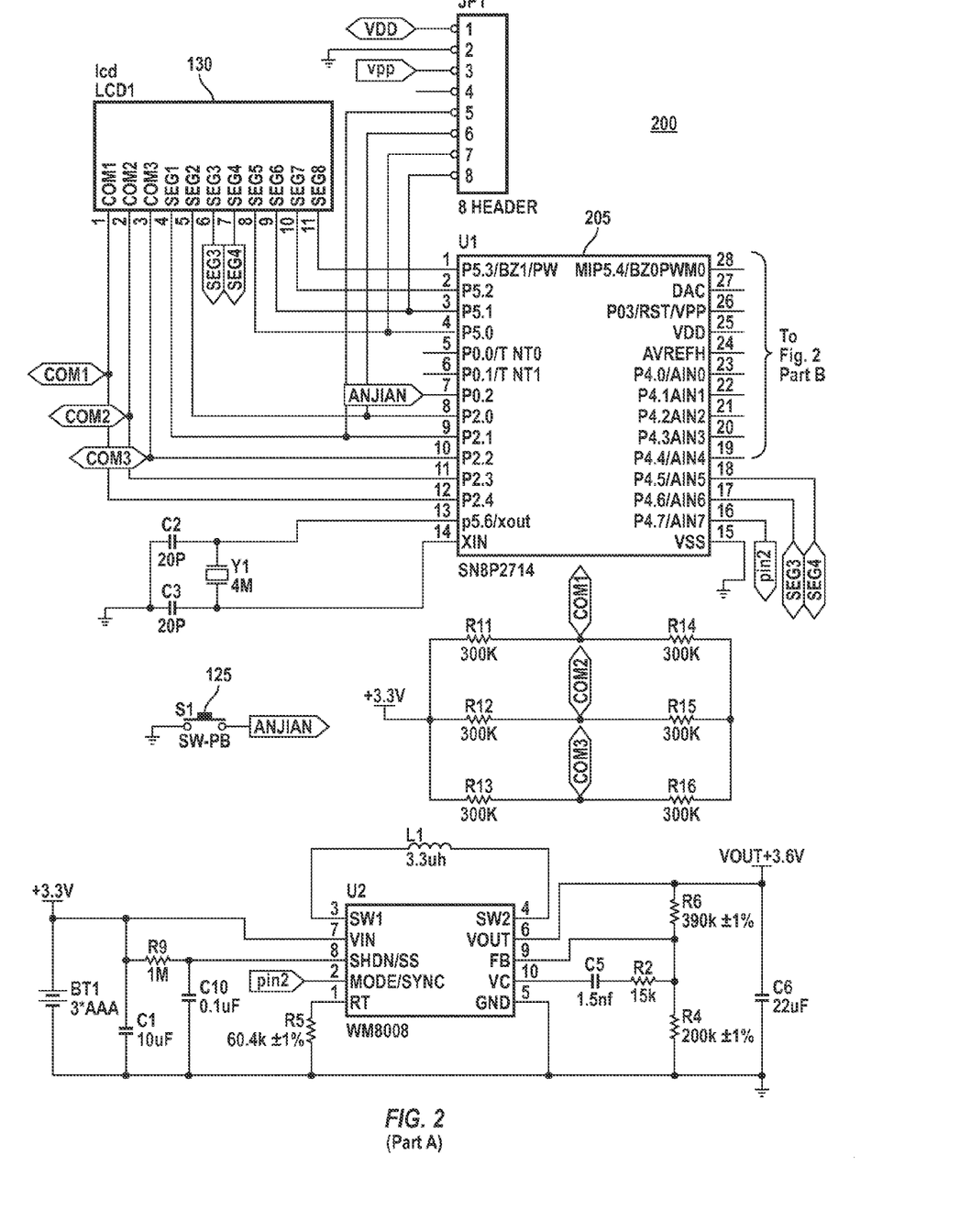
FIG. 2 is a simplified diagram of a circuit that is included in the flashlight shown in FIGS. 1A and 1B according to one embodiment of the present invention.

FIG. 2 is a simplified diagram of a circuit 200 that is included in flashlight 100 according to one embodiment of the present invention. Circuit 200 includes light generation element 210, on/off button 125, and display 130. Circuit 200 further includes microcontroller 205, which is coupled to the light generation element, the on/off button, and display. The microcontroller may be a Sonix SN8P2714 integrated circuit. The microcontroller is coupled to a voltage measure circuit 212, which includes resistors R17, R10, and capacitor C4. The circuit elements of the voltage measure circuit 212 are configured to perform voltage scaling and filtering for the monitoring of the battery voltage. Voltage measure circuit 212 is configured to monitor the voltage of the set of batteries across a sense resistor, a divider, and a filter, which includes R17, R10, and C4. The voltage measure circuit may be configured to transfer its output to an analog to digital (A/D) converter, which according to one embodiment is an element of the microcontroller.

According to a further embodiment, circuit 200 includes a current monitoring circuit 215, which is configured to monitor the current through the light generation element 210. The output of current monitoring circuit 215 provides a scaled voltage level to the microcontroller where the scaled voltage level is directly proportional to the amount of average current flow through light generation element 210. The microcontroller is configured to control the drive current through light generation element 210 to provide a match of proper voltage drop vs. time characteristics for each battery life (e.g., battery life 1, battery life 2, battery life 3 discussed below). The current monitor circuit may use closed loop control, which in combination with the microcontroller, is configured to provide a substantially constant delivery of average current through the light emitting device via closed loop control by comparison of a predetermined set point for current for a plurality of battery life discharge profiles versus measured variable current scaled and delivered to the microcontroller via the current monitoring circuit.

Both the voltage measure circuit and the current monitoring circuit may be configured to transfer their respective outputs to an analog to digital (A/D) converter, which according to one embodiment is an element of the microcontroller. The voltage received by the microcontroller is discussed in further detail below.

According to one embodiment of the present invention, the microcontroller includes an internal memory. According to an alternative embodiment, the memory is a discrete device that is external to the microcontroller. The memory may be configured to store instructions (e.g., computer code instructions, also sometime referred to herein as computer code) configured for use by the microcontroller to control the flashlight as described herein. The memory may also be configured to store a set of battery life information for various battery types. Battery life information may include an amount of time that a set of batteries may operate, i.e., battery life. For example, the memory may be configured to store battery life graphs and/or battery life tables for various battery types manufactured by a variety of battery manufacturers; and the effects of temperature on each. The battery life graphs and battery life tables are described in detail below. The battery life graphs and battery life table may be stored in memory in a compressed algorithmic encoded format or in raw form.

According to one embodiment of the present invention, the on/off switch is configured to place the light emitting element in one or more light generation states. The light generation states may include: i) a low light state, ii) an intermediate light state, iii) a bright light state, and iv) a flashing light state. In the low light state, the light emitting element is configured to generate less light and draw less current from the set of batteries than in the intermediate light state. In the intermediate light state, the light emitting element is configured to generate less light then and draw less current from the set of batteries than in the bright light state. According to one embodiment, the microcontroller may be configured to monitor the on/off switch to control the light generation states of the light generation element.

Figure 3:
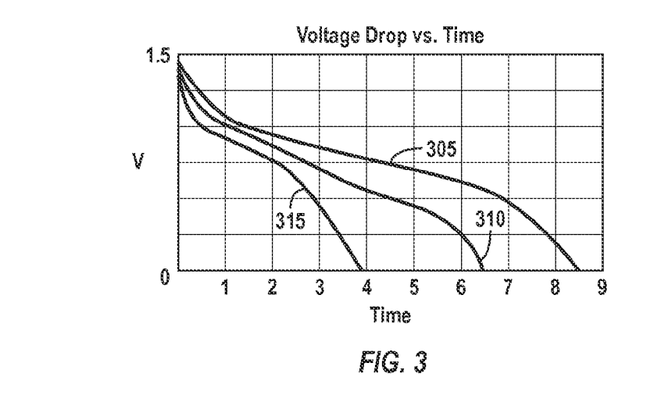
FIG. 3 is a battery life graph that includes a set of plots that represent the voltage output from a set of set of batteries over a time in which the set of batteries are used, for example, to power the flashlight.

FIG. 3 is a battery life graph 300 according to one embodiment of the present invention. The battery life graph includes a set of plots that represent the voltage output from a set of set of batteries over a time in which the set of batteries are used, for example, to power and light the light generation element. The battery life graph includes three plots for the different battery lives for three different discharge rates for the set of batteries. For example, plot 305 may be for the set of batteries for the low light state of the light generation element, plot 310 may be for the intermediate light state of the light generation element, and plot 315 may be for the bright light state and the flashing light state. It can be seen from the battery life graph that the battery life of the batteries in the low light state is longer than the battery life for the batteries in the intermediate light state, and the bright light state. It can similarly be seen that the battery life for the set of batteries in the intermediate light state is longer than the battery life for the bright light state. The battery life for the flashing light state may be the same as the battery life for the bright light state, according to one embodiment of the present invention. In other embodiment, the battery life for the flashing light state may be the same as the low light state, the intermediate light state, or a unique light state.

It can also seen from the battery life graph, the voltage output from the set of batteries decreases over time as a set of batteries are in use. The voltage drop rate for the set of batteries for each light state may be different. It can be seen in the battery life graph that plots 305, 310, and 315 have different rates at which the battery voltage drops over the time as the set of batteries are used. The voltage output from the set of batteries drops until the amount of voltage and current output by the batteries is no longer sufficient to power a portable device, such as flash light 100. As can further be seen in the battery life graph, the total battery life in the low light state is approximately 7.5 hours; the battery life in the intermediate life state is approximately 5.5 hours, and the battery life in the bright light state and the flashing light state is approximately 4 hours. It should be understood that these battery life times are exemplary. Battery life graph 300 may be for a set of alkaline batteries or the like as used in the flashlight. Battery life graph 300 may represent the battery lives for a set of batteries of a particular battery manufacturer.

Figure 4:
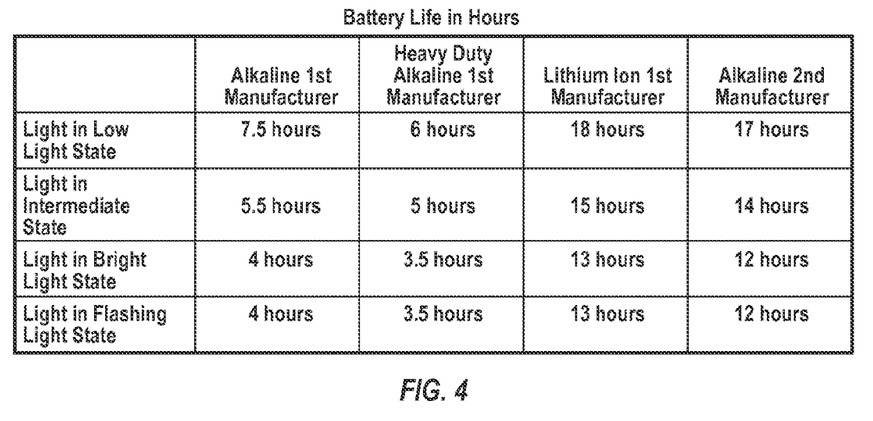
FIG. 4 is a battery life table that includes information for the battery lives of one or more sets of batteries according to one embodiment of the present invention.

FIG. 4 is a battery life table that includes information for the battery lives of one or more sets of batteries according to one embodiment of the present invention. The information for the battery lives may be the point at which the voltage goes substantially to zero in the plots shown in FIG. 3. The information for the battery lives may be for a variety of battery types, and/or batteries manufactured by a variety of manufacturers. For example, a first column of the table may be for a set of alkaline batteries for a first manufacturer, a second column may be for a set of heavy duty alkaline batteries for the first manufacturer, a third column may be for a set of lithium ion batteries for the first manufacturer, a fourth column may be for a set of alkaline batteries for a second manufacturer, etc. Each column in the table shown in FIG. 4 includes battery life information for a set of batteries in the low light state, the intermediate light state, the bright light state, and the flashing light state. For example, in the first column the top entry represents the battery life of 7.5 hours for a set of batteries in the low light state, the middle entry represents the battery life of 5.5 hours for the set of batteries in the intermediate light state, and the bottom on entry represents the battery life of 4 hours in the bright light state and the flashing light state.

While the information for the battery lives shown in the battery life table is for different light states of the light generation element, the information in the battery life table may be for a single light state, such as the bright light state. According to one embodiment, the battery life table is stored in the microcontroller memory or an external memory (not shown). If the stored battery life table includes information for battery light for a single light state, the microcontroller may be configured to calculate the battery lives for the other light states. For example, the microcontroller may be configured to multiply the information stored for the single light state (e.g., information for the bright light sate) by a multiplier, which may be a constant, a function of time, or the like, to generate information for the battery lives for the other light states (e.g., the low light state and the intermediate light state).

According to one embodiment, at the time the flashlight is turned on, the microcontroller starts the count down timer, and at the time the flashlight is turned off, the microcontroller stops the count down timer. The count down timer is not reset during the time the flashlight is turned off. The count down timer may be implements in a portion of the instructions that the microcontroller uses to perform the various operation described herein. The microcontroller may use an internal clock or an external clock (e.g., a crystal clock (not shown) on the circuit board) as a basis for the count down timer. The count down timer may increment every tenth of a second or the like, to accumulate the amount of the time that the flashlight has been turned on. The microcontroller may be configured to accumulate the amount of time that the flashlight is turned on for each light state. The microcontroller may further be configured to generate a single value for the amount of time that the flash light has been turned based on the times that the flash light have been turned on in one or more of the light states. The single value may represent the time the flash light has been turned on for one a given one of the light states, e.g., the bright light state. For example, if the flash light has been turned on 1 hour in the low light state, and 25 minutes in the intermediate light state, the microcontroller may be configured to execute a set of instructions to determine the equivalent amount of time the flash light has been turned on in the bright light state. For example, if the flash light has been turned on 1 hour in the low light state, and 25 minutes in the intermediate light state, these times cumulatively may be substantially equivalent to the set of batteries operating in the bright light state for 1.1 hours. The microcontroller may be configured to retrieve the battery life for a given set of batteries for the bright light state (e.g., alkaline, produced by manufacturer one, column one of the battery life table) and determine the remaining battery life for the set of batteries. According to the example being considered, the remaining battery life may be 2.9 hours.

According to a further embodiment of the present invention, voltage measure circuit 215 may be configured to detect the voltage output by the set of batteries and transfer this voltage or a function of the voltage to the A/D converter of the microcontroller. The A/D converter may be configured to generate a digital value of the voltage. The microcontroller may be configured to retrieve from memory the battery life graph for the given set of batteries (e.g., alkaline batteries of the first manufacturer). The microcontroller may further be configured to compare the digital value of the voltage to the voltage in the plot for the light state that the light generation element is currently set to. For example, if the light generation element if turned to the low light state, the microcontroller may be configured to compare digital value of the voltage to the voltage values in low light plot 305 to determine the remaining battery life for the set of batteries. The microcontroller may be configured to generate a new digital value of the voltage and make the foregoing described comparison every tenth of a second, for example.

The microcontroller is further configured to determine whether the remaining battery life generated from the timer based calculation is less than the remaining battery life generated from the voltage measurement. This determination may be made every tenth of a second, for example. The microcontroller is then configured to control the display to display the lesser of the determined remaining battery lives. That is, if the remaining battery life generated from the timer based calculation is less than the remaining battery life generated from the voltage measurement, then the remaining battery life generated from the timer based calculation is displayed on the display. Alternatively, if the remaining battery life generated from the voltage based measurement is less than the remaining battery life generated from the timer based calculation, then the remaining battery life generated from the voltage based measurement is displayed on the display. The remaining battery life may be displayed in an hours and minutes format.

According to one embodiment of the present invention, the time accumulated by the count down timer may be adjusted upward based on the remaining battery life determined from the voltage measurement of the voltage output by the set of batteries. For example, if the microcontroller determines from a voltage measure of the batteries that the remaining battery life if less than the remaining battery life determined from the timer based calculation, then accumulated time may be adjusted up to reflect a lower remaining battery life.

The described adjustment to the accumulated time may reflect a relatively sudden drop in the voltage output from the batteries, for example, if the flashlight is moved from a warm environment to a cooler environment. This adjustment to the accumulated time may alternatively reflect that used batteries have been put in the flashlight. Batteries that have previously been used and are then placed into the flashlight will generally have a shorter battery life than new batteries of the same type. The time accumulated by the count down timer may be reset to zero each time each time a different set of batteries is placed in the flashlight. For example, the microcontroller may be configured to detect the absence of batteries if the microcontroller has a power reset (e.g., if the batteries are removed from the flashlight) and may reset the accumulated time of the count down timer at the time the microcontroller powers back up (e.g., if batteries are placed back into the flashlight).

According to one embodiment of the present invention, the accumulated time of the count down timer is not decreased (e.g., the remaining battery life determined from the timer calculation is not increased) based on the voltage output from the set of batteries. For example, if the voltage of the set of batteries "rebounds" (i.e., goes up) for a period of time after the flashlight is turned off and then turned back on, the rebound generally does not indicate a "true" increase in the overall battery life. Similarly, if the temperature of some types of batteries rise during use, the output voltage of the batteries increases. However, this rise in voltage also does not generally indicate a true increase in the overall battery life. Therefore, rebounds of the voltage are not used to adjust the accumulated time of the count down timer.

Flashlight 100 may include one or more devices that a user may use to indicate to the flashlight the type of batteries used in a flashlight and/or the manufacturer of the set of batteries. For example, the flash light may include a jumper to indicate to the flashlight the battery type and/or the battery manufacturer. Alternatively, the microcontroller may be configured to control the display to permit the entry of information for battery type and/or manufacturer. The flashlight may include any of a variety of devices that are configured to receive user input to select battery type and/or manufacturer via the display, such as a set of buttons, a touch pad coupled to the display or the like. Those of skill in the art will readily know a various other devices that may be configured for use on the flashlight that are user configurable to select battery type and manufacturer.

According to an alternative embodiment of circuit 200, the circuit may include one or more temperature sensors. For example, a battery temperature sensor may be disposed in the battery compartment and may be coupled to the microcontroller. The battery temperature sensor may be configured to monitor the temperature of the set of batteries during use of the flashlight. The battery temperature sensor may be configured to transfer information for the monitored temperature to the microcontroller. Variation in temperature of the set of batteries may place duress on the set of batteries, for example, shortening the battery life of the set of batteries. Information may be stored in the memory related to battery life versus battery temperature. The microcontroller may be configured to adjust the accumulated time of the count down timer based on the monitored temperature of the set of batteries and the stored temperature information.

It is to be understood that the examples and embodiments described above are for illustrative purposes only and that various modifications or changes in light thereof will be suggested to persons skilled in the art and are to be included within the spirit and purview of this application and scope of the appended claims. For example, while embodiments for a circuit and display for determining and displaying battery life have been described for use in a flashlight, these devices may be used in a variety of portable devices, which use batteries, such as non-rechargeable batteries. Therefore, the above description should not be understood as limiting the scope of the invention as defined by the claims.

What is claimed is:

1. A circuit configured for use in a portable electronic device, which is configured to be powered by a battery, the circuit comprising:
    a memory configured to store battery life information for the battery, wherein the battery life information includes a battery life of the battery and includes voltage output information of the battery over a time of use of the battery to power the portable electronic device;
    a controller coupled to the memory and configured to receive the battery life information from the memory and to operate as a count down timer to accumulate an amount of time that the battery provides power to the portable electronic device;
    a voltage measure circuit coupled to the controller and configured to monitor the voltage output by the battery while the battery provides power to the portable electronic device to power the portable electronic device and to supply voltage information for the voltage output to the controller;
    wherein the controller is configured to i) determine a first remaining battery life for the battery via comparison of the accumulated time to the battery life, ii) determine a second remaining battery life via comparison of the supplied voltage information from the voltage measure circuit to the voltage output information of the battery over time, and iii) determine the lesser of the first remaining battery life and the second remaining battery life; and
    a display coupled to the controller and configured to receive a command from the controller to display the lesser of the first remaining battery life and the second remaining battery life.

2. The circuit of claim 1, wherein the display is configured to display the lesser of the first remaining battery life and the second remaining battery life in an hours and minutes format.

3. The circuit of claim 1, wherein the display is configured to display a plurality of colors and the colors indicate different percentages of remaining battery life of the battery.

4. The circuit of claim 3, wherein the plurality of colors includes green, yellow, orange, and red.

5. The circuit of claim 1, further comprising a temperature sensor disposed in a battery compartment and coupled to the controller, wherein the temperature sensor is configured to detect the temperature of the battery, and the controller is configured to receive temperature information from the temperature sensor and adjust the first remaining battery life based on the temperature information.

6. The circuit of claim 1, wherein the controller is configured to decrease the first remaining battery life to the second remaining battery life if the second remaining battery life is less than the first remaining battery life.

7. A portable electronic device configured to be powered by a battery, the portable electronic device comprising:
    a memory configured to store battery life information for the battery, wherein the battery life information includes a battery life of the battery and includes voltage output information of the battery over a time of use of the battery to power the portable electronic device,
    a controller coupled to the memory and configured to receive the battery life information from the memory and to operate as a count down timer to accumulate an amount of time that the battery provides power to power the portable electronic device;
    a voltage measure circuit configured to monitor the voltage output by the battery while the battery provides power to power the portable electronic device and to supply voltage information for the voltage to the controller;

wherein the controller is configured to i) determine a first remaining battery life for the battery via comparison of the accumulated time to the battery life, ii) determine a second remaining battery life via comparison of the supplied voltage information from the voltage measure circuit to the voltage output information of the battery over time, and iii) determine the lesser of the first remaining battery life and the second remaining battery life; and a display coupled to the controller and configured to receive a command from the controller to display the lesser of the first remaining battery life and the second remaining battery life.

8. The portable electronic device of claim 7, further comprising a closed loop control circuit configured to provide a substantially constant delivery of average current through a light emitting device via closed loop control, wherein the closed loop control circuit is configured to compare a predetermined set point for current for a plurality of battery life discharge profiles versus measured variable current scaled and delivered to the microcontroller via the closed loop control circuit.

9. The portable electronic device of claim 7, wherein the display is configured to display the lesser of the first remaining battery life and the second remaining battery life in an hours and minutes format.

10. The portable electronic device of claim 7, wherein the display is configured to display a plurality of colors and the colors indicate different percentages of remaining battery life of the battery.

11. The portable electronic device of claim 7, wherein the controller is configured to decrease the first remaining battery life to the second remaining battery life if the second remaining battery life is less than the first remaining battery life.

* * * * *